Patented Jan. 1, 1924.

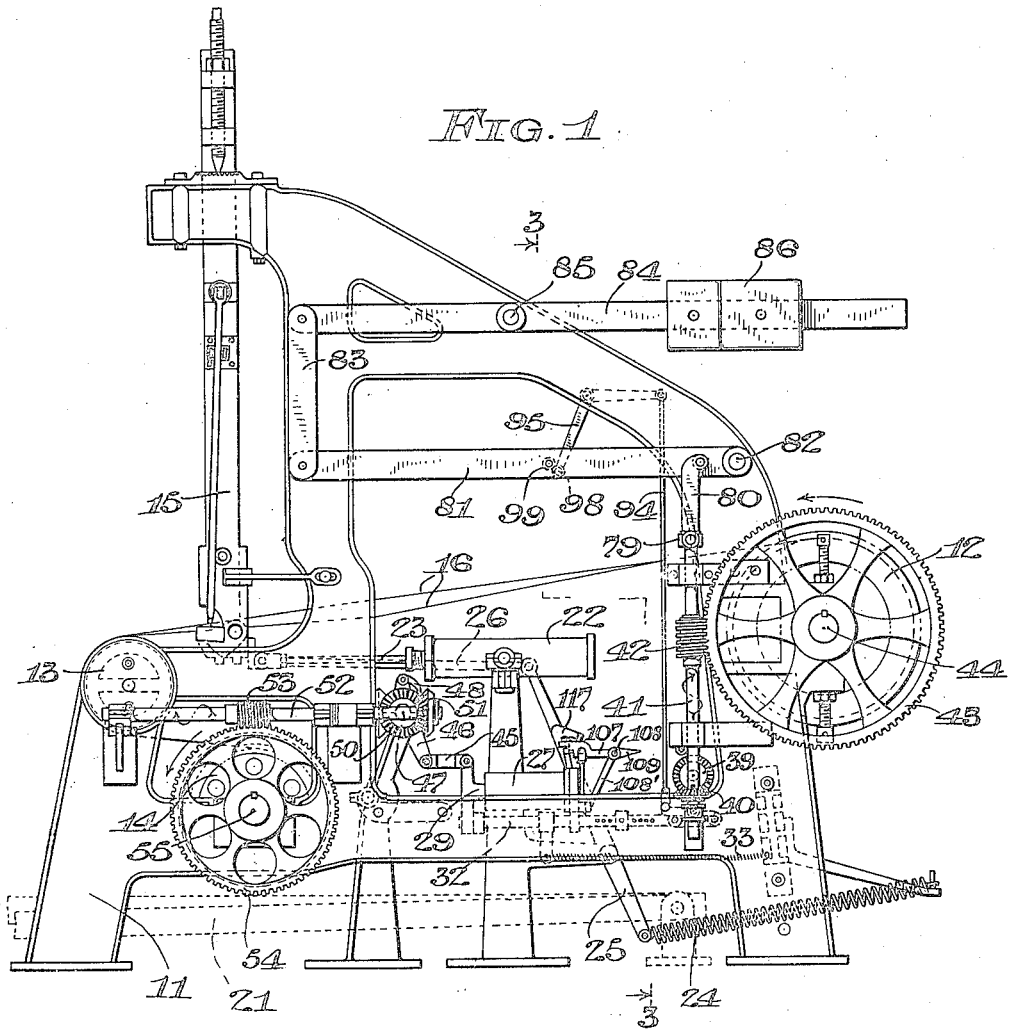

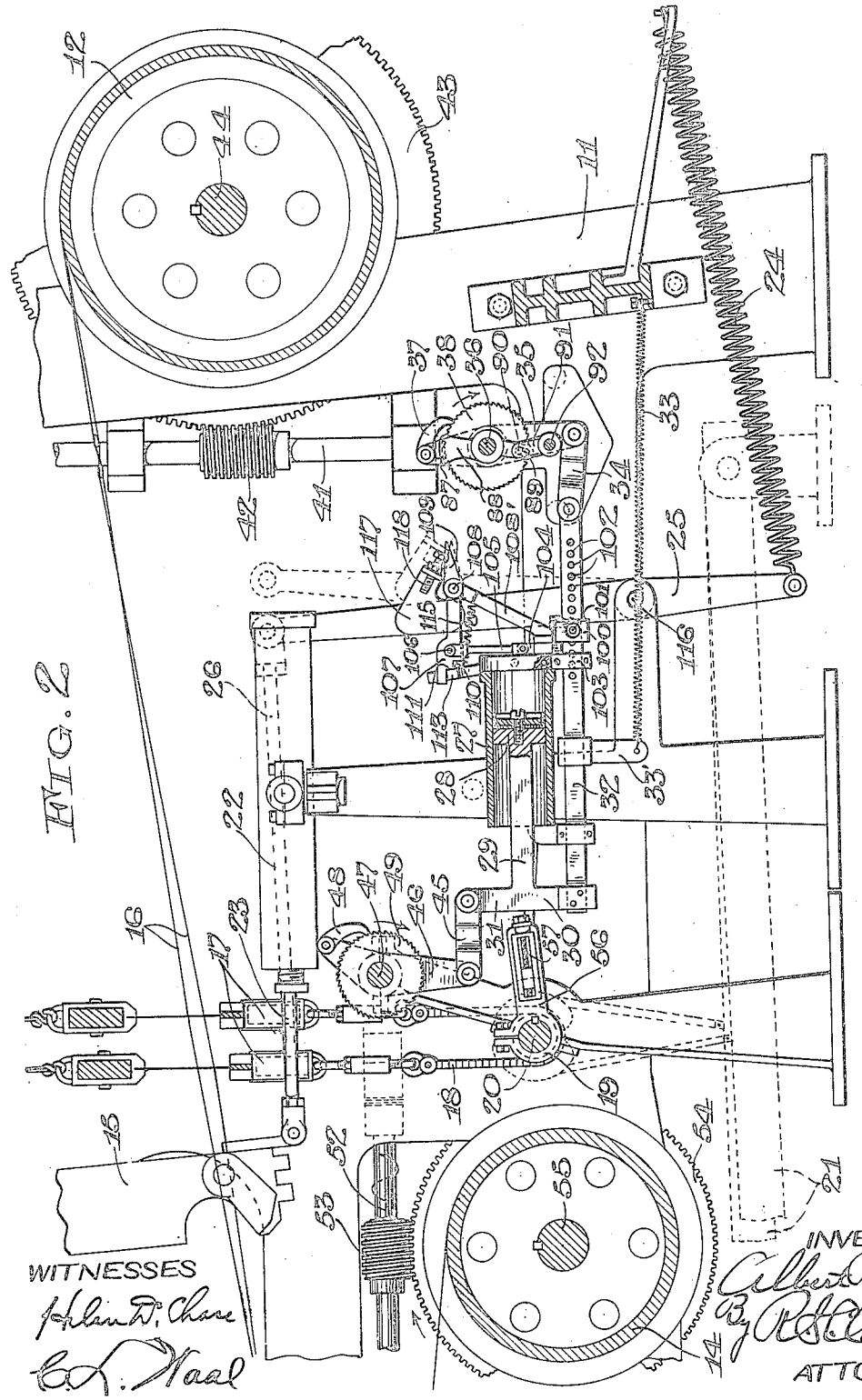

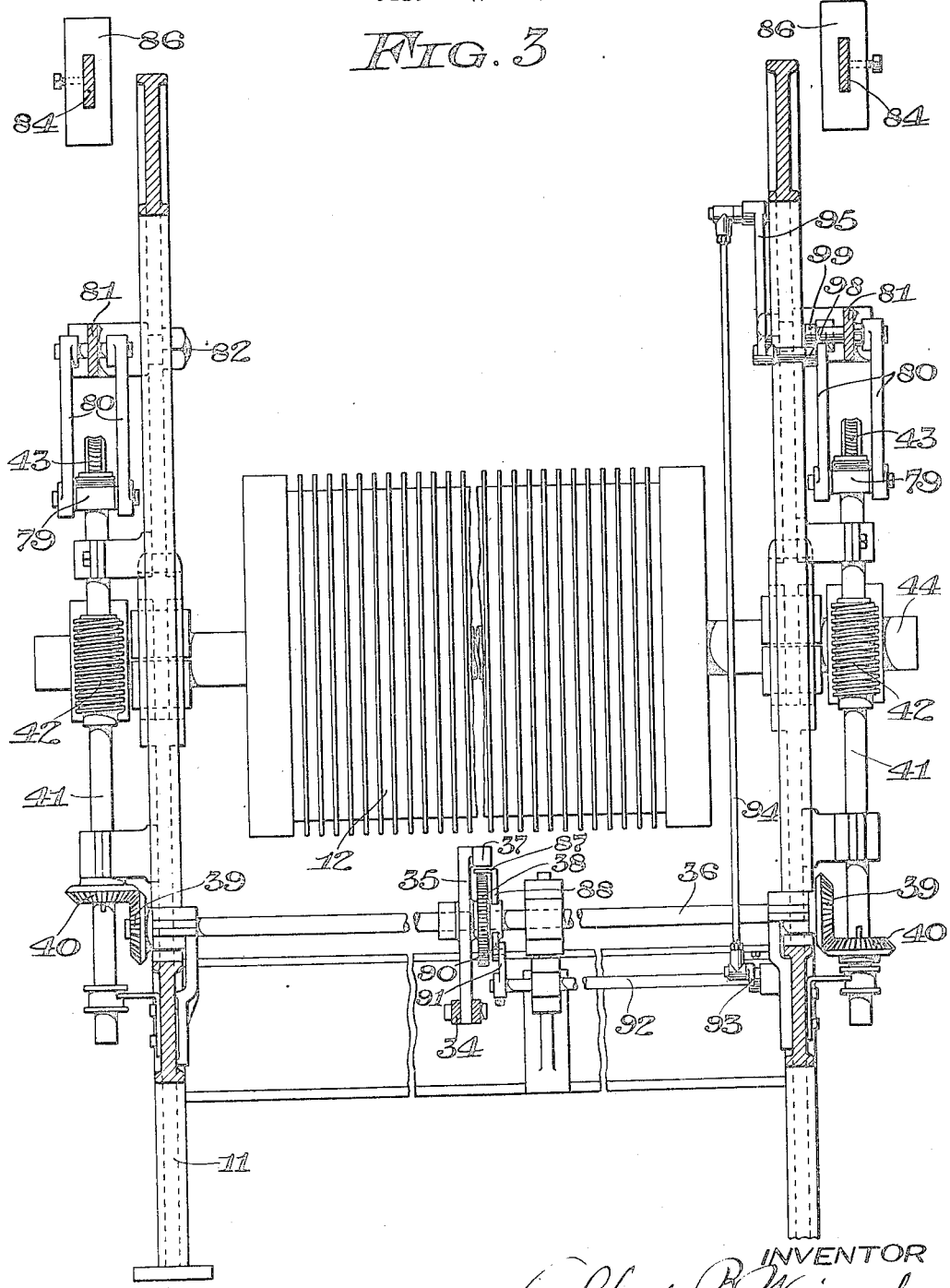

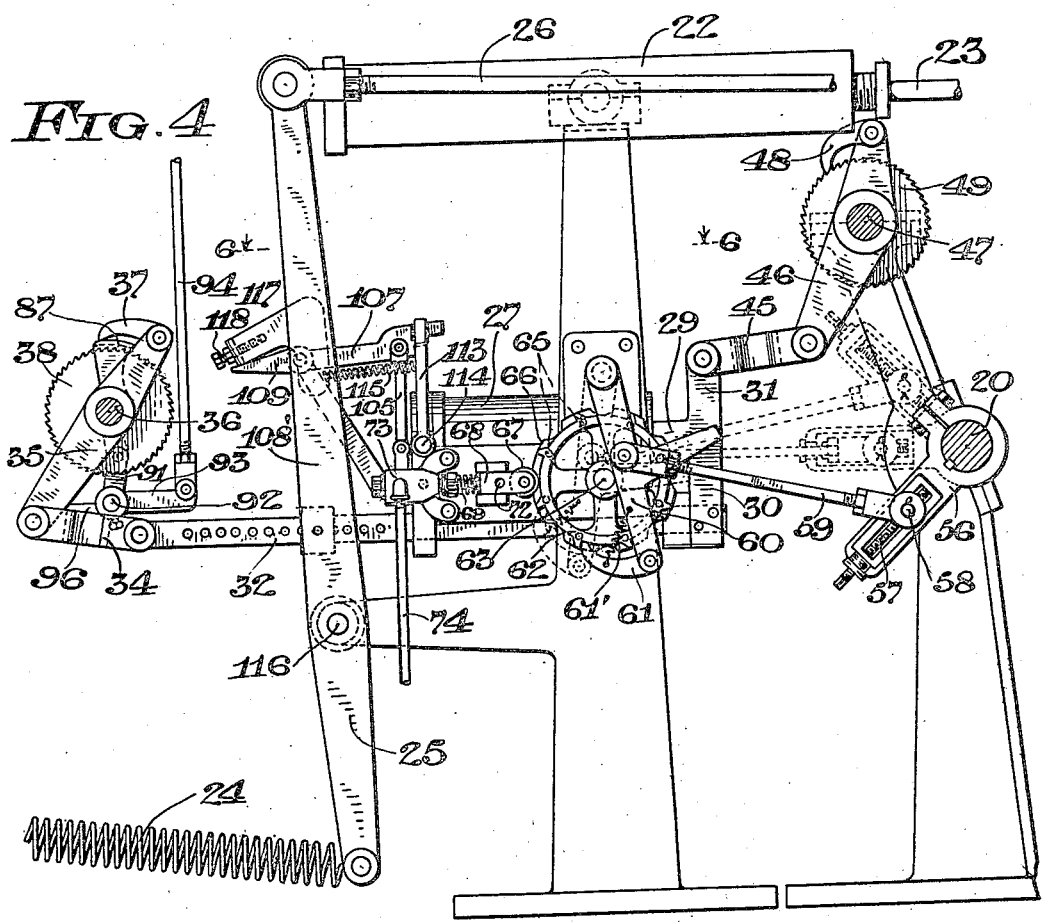

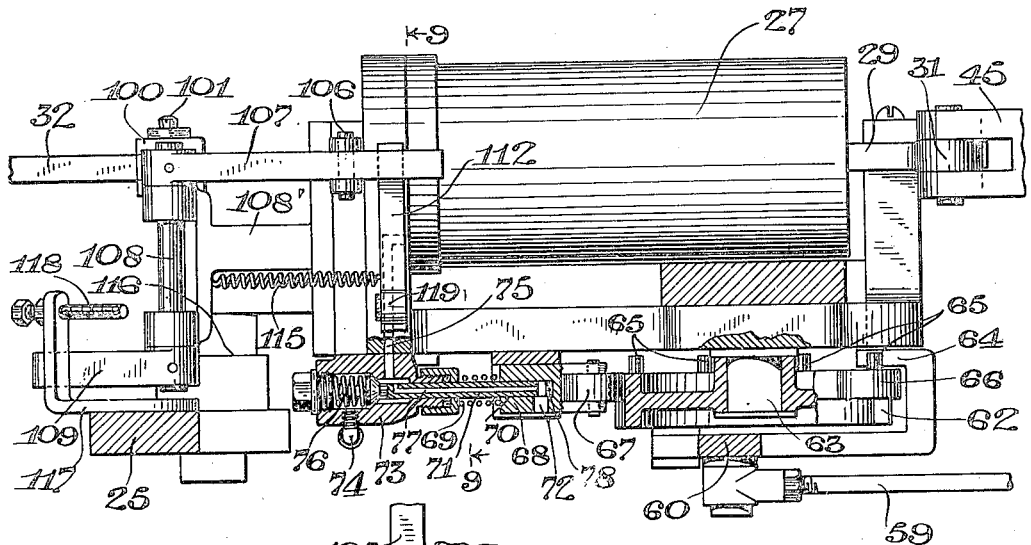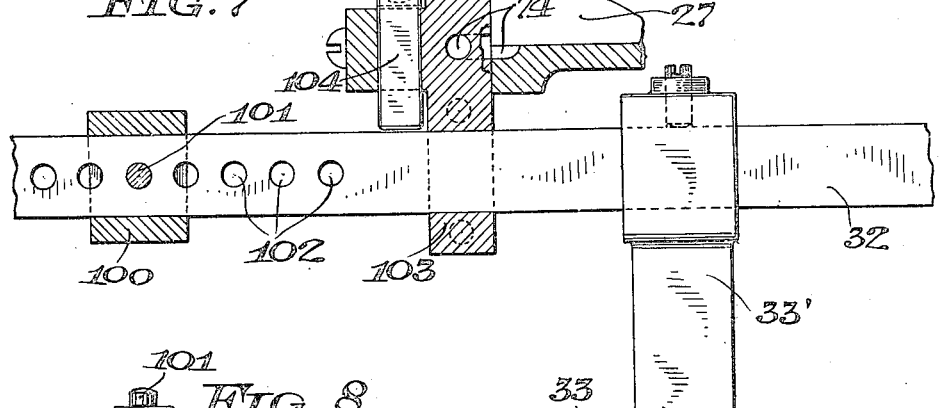

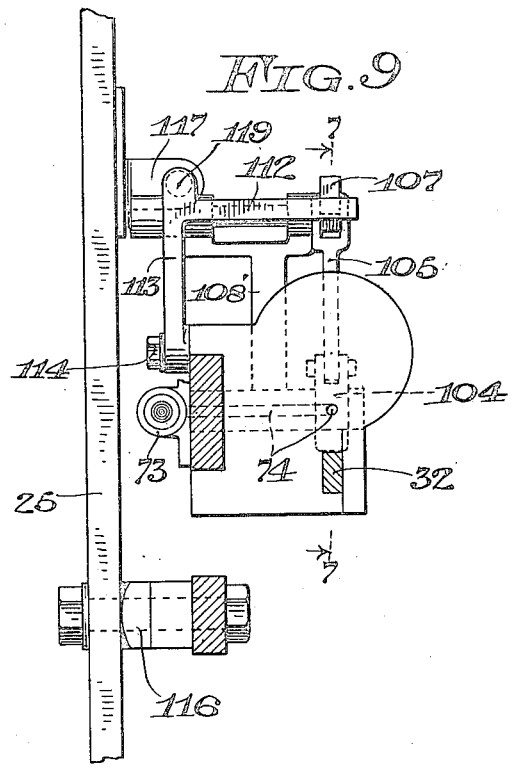
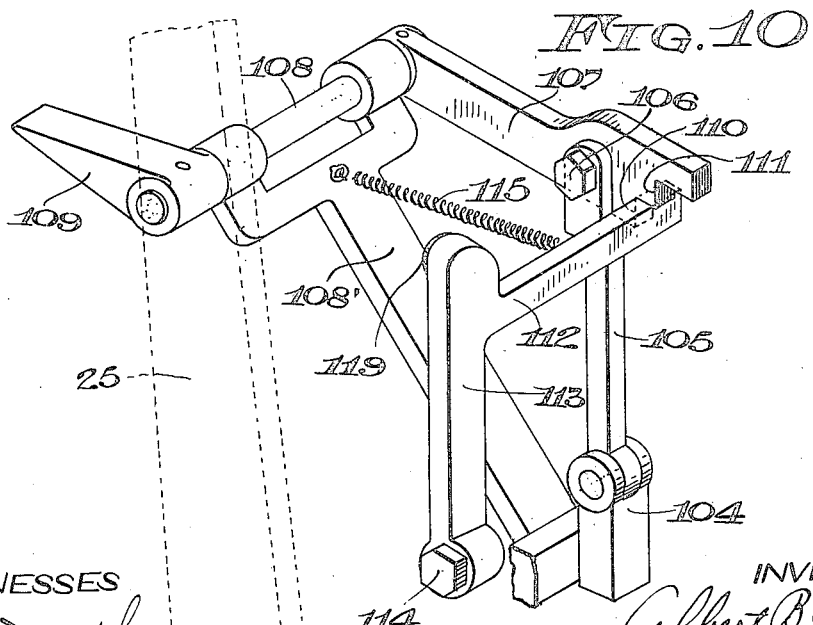

1,479,571

UNITED STATES PATENT OFFICE.

ALBERT B. WEISSENBORN, OF APPLETON, WISCONSIN, ASSIGNOR TO APPLETON WIRE WORKS, OF APPLETON, WISCONSIN, A CORPORATION OF WISCONSIN.

TAKE-UP AND LET-OFF MECHANISM FOR LOOMS.

Application filed August 27, 1921. Serial No. 496,137.

*To all whom it may concern:*

Be it known that I, ALBERT B. WEISSENBORN, a citizen of the United States, and resident of Appleton, in the county of Outagamie and State of Wisconsin, have invented new and useful Improvements in Take-Up and Let-off Mechanism for Looms, of which the following is a description, reference being had to the accompanying drawings, which are a part of this specification.

The invention relates to looms, particularly wire-weaving looms, such as looms for weaving Fourdrinier wires, and more particularly to the let-off and take-up mechanisms for such looms and the governing of said mechanisms.

One of the objects of this invention is to provide for the simultaneous actuation of the take-up and let-off mechanisms.

A further object of the invention is to provide for the actuation of the take-up mechanism during the closing of the shed.

A further object of the invention is to provide a common actuator for both the let-off and take-up mechanisms.

A further object of the invention is to provide for the simultaneous operation of the let-off and take-up mechanisms with separate governing means for each of said mechanisms, there being a take-up for every let-off, and the governing means compensating for the conditions met in the weaving operation by varying the amount of let-off and take-up for the purpose of equalization of the tension on the warp wires whereby the differential action between the take-up and let-off mechanisms may be very closely gauged with the result that a more accurate weaving is produced.

A further object of the invention is to effect the governing of the let-off mechanism through the action of the tension lever.

A further object of the invention is to effect the governing of the take-up mechanism by the mechanism which actuates the swinging lay.

The invention further consists in the several features hereinafter set forth and more particularly defined by claims at the conclusion hereof.

In the drawings: Fig. 1 is a side view of a loom provided with mechanism embodying the invention; Fig. 2 is a vertical sectional view through the loom, showing up mechanism embodying the invention; Fig. 3 is a section taken on the line 3—3 of Fig. 2; Fig. 4 is an enlarged detail side view of the parts shown in Fig. 2 looking from the opposite side of the machine; Fig. 5 is a detail view of a portion of the let-off governing mechanism; Fig. 6 is a detail sectional view taken on the line 6—6 of Fig. 4; Fig. 7 is a detail sectional view taken on the line 7—7 of Fig. 9; Fig. 8 is a detail plan view of one of the parts shown in Fig. 7; Fig. 9 is a section taken on the line 9—9 of Fig. 6; Fig. 10 is a perspective view of certain parts of the take-up governing mechanism.

In these drawings the numeral 11 indicates the side frames of the loom between which are mounted the warp-beam 12, the breast-beam 13 and the receiving-roll 14, as usual. The swinging lay 15 operates as usual to beat up the weft wire left by the shuttle in its travel through the shed formed between the warp wires 16 by the alternate reciprocation of the heddles 17 which are connected by a chain 18 to a collar 19 on the heddle shaft 20 which is rocked in a well known manner by the operator from foot treadles 21, Figs. 1 and 2. As is usual, the lay is pulled back by a piston working in an air cylinder 22 and having its rod 23 connected to the lay and is returned by a spring 24 connected at one end to the frame of the machine and at its other end to a lever 25 operatively connected by a link 26 to the lay, the spring being capable of adjustment to regulate the throw of the lay, the admission of air to the cylinder 22 being controlled by the operator.

An air cylinder 27 is mounted on the frame of the machine and has a piston 28 working therein and connected to a rod 29 which has arms 30 and 31.

The arm 30 is connected to an operating bar 32 slidably mounted in suitable guides carried by the cylinder, the bar being moved in one direction by the pressure of the air upon the piston 28 and in the opposite direction by a spring 33 secured to a bracket 33' adjustably mounted on the bar 32. The bar 32 is connected by a link 34 to a lever 35 loosely mounted on a shaft 36 and carrying a pawl 37 engageable with a ratchet wheel 38 on said shaft. This shaft 36 carries bevel gears 39 at its ends meshing with bevel gears 40 on upright shafts 41 which carry worms 42 meshing with worm wheels 43 on the warp-beam shaft 44, Fig. 3. With this construction the forward movement of the piston 28 and bar 32 causes the pawl 37 to turn the wheel 38 a partial turn and consequently the shaft 36, the shafts 41 and worms 42 to thereby turn the warp-beam 12 in a direction to unwind the wires. This produces the "let-off."

The arm 31 is connected by a link 45 to a lever 46 loosely mounted on a shaft 47 and carrying a pawl 48 engageable with a ratchet wheel 49 on said shaft. This shaft 47 carries bevel gears 50 meshing with bevel gears 51 on horizontal shafts 52 which carry worms 53 meshing with worm wheels 54 on the receiving-roll shaft 55, only one shaft 52 being shown, Figs. 1 and 2. With this construction the forward movement of the piston 28 causes the pawl 48 to turn the wheel 49 a partial turn and consequently the shafts 47, the shafts 52 and worms 53 to thereby turn the receiving-roll 14 in a direction indicated by the arrow in Fig. 1, to take up the woven cloth. This produces the "take-up."

The operation of the piston 28 is controlled from the heddle shaft 20, as more particularly shown in Figs. 4 and 6. For this purpose an arm 56 is mounted on the shaft 20 and carries a screw 57 upon which a pivot 58 for a link 59 is adjustably mounted, said link being connected to a lever 60 carrying a pawl 61 held by a spring 61' against a ratchet wheel 62 mounted on a shaft 63. Overrunning of the wheel 62 is prevented by a stop 64 formed on the lever 60 successively engageable with pins 65 on the wheel 62.

When the arm 56 moves inwardly from its full line position to its midposition, shown in dotted lines in Fig. 4, or from its upper dotted line position, in said view, to its midposition, the link 59, lever 60 and pawl 61 act to move the ratchet wheel. The movement of the arm 56 under the conditions above named, by the movement of the heddle shaft 20, takes place in each instance during the closing of the shed and acts to impart a step-by-step or intermittent rotary movement to the wheel 61.

A cam 66 is connected to or formed integral with the wheel 62 and is engaged by a roller 67 carried by a sliding block 68, a spring 69 holding the roller against the cam. The block 68 has a bore 70 therein receiving the stem of a valve 71 and provided with an exhaust port 72. The valve 71 works in a casing 73 and controls admission of air from a compressed air supply pipe 74 to a conduit 75 communicating with the head end of the cylinder 27, said valve being held to its seat by a spring 76 and adapted to be opened by the forward movement of the block 68. The stem of the valve has a duct 77 extending through it to establish communication between the conduit 75 and the exhaust port 72 when the valve is closed. When the valve is opened by the block 68 a plug 78 of leather or other suitable valve material at the end of the bore 70 prevents the passage of air from the duct 77 to the port 72. When the roller 67 passes into one of the recesses on the cam 66, the plug 78 leaves the lower end of the stem and the air in the cylinder is exhausted as previously pointed out, the spring 33 returning the piston 28.

Tension is given the warp wires 16 by means giving the warp beam 12 a tendency to turn backwardly or in a direction to rewind the wires thereon to permit the wires being unwound therefrom without materially varying the tension. This is accomplished by the employment of means exerting a lifting force upon the shafts 41 and worms 42. At the upper end of each shaft 41 is swivelled a block 79 connected by links 80 to a lever 81 which is fulcrumed at 82 on the frame. Each of the levers 81 has a link connection 83 with a tension lever 84 fulcrumed at 85 on the frame and provided with adjustable weights 86 acting through said links 83, levers 81, links 80 and blocks 79 to lift the worms 42 and thereby turn the worm wheels 43 backwardly to tighten the wires forming the shed. The gears 40 are slidably keyed to the shafts 41 to permit this movement but the shafts 41 are compelled to turn with the gears. As the wire is drawn off the warp-beam during the operation of the loom, this backward tendency is overcome and the worm 42 with its shaft 41 is moved downwardly, causing the weight to rise, because of the pull on the warp-beam by the forwardly moving warp wires. The turning of the shafts 41 by the let-off drive mechanism not only turns the warp-beam, but also serves to move the worms to different positions on the worm wheels without interrupting the tensioning. The degree of movement of the various parts is not great, for the worms are only given a fractional turn with each operation. Under normal conditions, when the lay carrying the reed beats up a weft wire, the concussion causes lever 81 to momentarily drop. It is this momentary depression which is used to accomplish the governing of the let-off mechanism.

From the foregoing, it will be noted that during the closing of the shed the air valve 71 is opened to admit air into the cylinder 27 to act against the piston 28 to effect the working stroke and thereby simultaneously operate the let-off mechanism and the take-up mechanism. I find it desirable to have the operation of the take-up mechanism occur during the closing of the shed. It will be further noted that the amount of let-off and take-up will depend upon the feed of the pawls 37 and 48, respectively.

The feed of the pawls has to be regulated to suit the kind of wire being woven and also, as the weaving progresses, the woven cloth piles up on the receiving-roll so that there must be some method compensating for the difference between a wire with one lap on the receiving-roll and one with the diameter increased by several laps, in other words, governing means are provided for varying the feed of the pawls 37 and 48, and in the present instance I provide separate governing means for the let-off pawl 37 and the take-up pawl 48.

The governing mechanism for the pawl 37 consists of a shield 87 movable in the path of said pawl and means influenced by the position of the levers 81 and 84 for varying the position of this shield. The shield 87 is carried by a lever 88 loosely mounted on the shaft 36, said lever having a slotted end 89 receiving a pin 90 on a crank 91 carried by a rock shaft 92, said shaft having an arm 93 connected by a link 94 to a bell crank lever or trigger 95 and an arm 96 engageable with an adjustable stop 97, Figs. 1 to 5. The bell crank lever 95 has a roller 98 in the path of movement of a roller 99 on one of the levers 81. As previously stated, the concussion due to the beating up a weft wire causes a momentary drop of the lever 81 from its horizontal position in which it is maintained by the tension lever 84. When the lever 81 drops and the weight 86 rises the roller 98 strikes the roller 99, thereby swinging the lever 95 to move the link 94 upwardly. The upward movement of the link 94 swings the arm 93 and turns the shaft 92 so as to move the shield 87 in a clockwise direction, as viewed in Fig. 4, thus allowing the pawl 37 to pass over more teeth and allow a greater let-off. As the weighted end of lever 84 moves down this amount of let-off is decreased, since the shield is then moved in the opposite direction and a less number of teeth are exposed to the action of the pawl. The oscillating or dancing movement of the lever 81 incident to the blow of the reed varies during the weaving operation and this variance produces a variable lift on the link 94 which in turn causes the shield to vary its position and thus vary the feed of the pawl. With the construction above described the feed of the pawl is so varied that the weighted lever 84 is kept in an approximately horizontal position so that the proper tension is exerted on the warp wires.

The governing mechanism for the pawl 48 consists of means for varying the swing of its lever 46 by varying the stroke of the bar 32, said means being influenced by the swinging of the lay. Upon the bar 32 I mount a stop block 100. This block is slidably mounted on said bar and adapted to be secured thereto in different positions of adjustment by means of a taper pin 101 passing through any one of a series of holes 102 in the bar and through alined holes in the block. This block is adapted to strike a projection 103 on the head of the air cylinder or another stop 104 slidably mounted on the cylinder head in front of the projection 103, Figs. 2 and 6 to 10. The stop 104 is connected by a link 105 to a pivot 106 on an arm 107 secured to a shaft 108 journalled in a bracket 108', said shaft carrying an arm 109. The free end of the arm 107 is provided with stepped notches 110 and 111, either of which is adapted to receive the laterally projecting portion 112 of a lay-operated lever 113 which is fulcrumed at 114 on the air cylinder and is held in engagement with the arm 107 by a spring 115. The lever 25 of the lay shifting mechanism is fulcrumed at 116 and carries a bracket 117 having a tappet member 118 in the form of a screw adjustably mounted thereon. The arm 109 and the upper end 119 of the lever 113 are in the path of movement of the tappet 118, the rearward swinging movement of the upper end of the lever 25 causing the head of the screw 118 to strike the lever. During every swing of the lay the lever 25 moves the tappet so that the head of the screw strikes the arm 109 to swing the arm 107 upwardly, the extent of the downward swing of this arm is determined by the engagement of the arm 112 of the lever 113 either with the notch 110 or notch 111 when the lever is in a position to engage with notch 110 then link 105 and stop 104 move down to such an extent as to bring stop 104 in the path of movement of the stop 100, and when the lever is in a position to engage with notch 111 then stop 104 is out of the path of movement of stop 100 and the bar 32 moves until it strikes stop 103. The position of the lever 113 to engage either the notch 110 or 111 is determined by the swing of the lay. During operation when the swing of the lay is not sufficient to cause the tappet 18 to strike the end 119 of the lever 113 the notch 110 is then engaged by the arm 112 so that stop 104 does not come into operation and there is a full stroke of the bar 32 to cause a full swing of the lever 46 and feed of the ratchet wheel 49 to accomplish a complete take-up. By full stroke I mean the bar travels until the stop 100 strikes the projection 103. This full stroke may, of course, be varied by shifting the stop 100 along the bar. When the swing of the lay increases to such an extent as to cause the tappet 18 to strike the end 119 of the lever 113 and knock the arm 112 off of the notched step 110 then the arm 107 drops down until notch 111 engages with lever 113 and this causes the link 105 and stop 104 to move down so that said stop comes into the path of movement of the stop 100 to produce less than a full stroke of the bar and consequently a partial swing of the lever 46 and feed of the ratchet wheel 49 to produce less take-up. When too much wire is being woven the increased swing of the lay causes the tappet 18 to strike the lever 113 and produce the knock-off so as to lessen the take-up by the change in the feed of the pawl 48 and the worm shafts 52. As a practical illustration of this take-up governing in the weaving of seventy mesh wire I allow the pawl to feed five teeth of the ratchet during a full set stroke of the bar 32. This weaves over and in order to effect the proper weave the knock-off allows the stop 104 to drop down, decreasing the stroke of the bar 32 to an extent of feeding the pawl four teeth. It is impossible to adjust the pawl to feed the same number of teeth each time, as the conditions of weaving change and as these changes take place and the swinging of the lay changes the pawl 48 is made to take up a greater or less number of teeth as, for instance, 4 or 5 teeth to effect the proper compensation in the take-up. The varying of the stroke of the bar 32 is not made to have any material effect on the movement of the lever 35 and the pawl 37, as the feed of this pawl is made to depend upon the position of the shield 87 determined by the dancing movement of the lever 81.

From the foregoing description of the governing means it will be noted that the take-up and let-off mechanism operate during each closing of the shed and that compensation is effected by feeding the ratchets 38 and 49 through a greater or less arc of movement for each take-up and let-off. This differential action insures the letting-off of more warp wire than is being taken up and maintains the proper tension on the warp wires to provide for very accurate weaving.

I desire it to be understood that this invention is not to be limited to any specific form or arrangement of parts except in so far as such limitations are specified in the claims.

What I claim as my invention is:

1. In a loom, the combination, with the heddle shaft the receiving-roll and take-up mechanism for said roll, of means, controlled by the movements of said shaft, for actuating said mechanism during the closing only of the shed.

2. In a loom, the combination, with the warp-beam and receiving-roll, of let-off mechanism for the warp-beam, take-up mechanism for the receiving-roll, and a single fluid pressure-operated means for actuating both of said mechanisms.

3. In a loom, the combination, with the warp-beam and receiving-roll, of let-off mechanism for the warp-beam and take-up mechanism for the receiving-roll, a member operatively connected to both of said mechanisms, an air cylinder, a piston working in said cylinder and connected to said member, and means for admitting compressed air to said cylinder during the closing of the shed.

4. In a loom, the combination, with the warp-beam and receiving roll, of let-off mechanism for the warp-beam and take-up mechanism for the receiving-roll, a member operatively connected to both of said mechanisms, a compressed-air cylinder, a piston working in said cylinder and connected to said member, a control valve for said cylinder, cam operated means for actuating said valve, an oscillatory heddle shaft, and means for moving said cam on the movement of said shaft.

5. In a loom, the combination with the receiving-roll, of take-up mechanism for said roll, a fluid-pressure-operated reciprocating member actuating said take-up mechanism, and means including an automatically adjustable stop for varying the stroke of said member to vary the operation of the take-up mechanism.

6. In a loom, the combination with the swinging lay and the receiving-roll, of take-up mechanism for said roll, a reciprocating member, distinct from the lay, actuating said take-up mechanism, and means controlled by the swinging of the lay for varying the stroke of said reciprocating member to vary the action of the take-up mechanism.

7. In a loom, the combination with the swinging lay and the receiving-roll, of take-up mechanism for said roll, and a reciprocating member actuating said mechanism and provided with a stop, a fixed stop, a stop movable into and out of position between the fixed stop and the stop on said member to vary the stroke of said member and thereby vary the action of the take-up mechanism, and means controlled by the swinging of the lay for determining the position of said movable stop.

8. The combination, with the lay operating mechanism and the receiving-roll, of take-up mechanism for said roll, and a reciprocating member actuating said mechanism and provided with a stop, a fixed stop, a stop movable into and out of position between the fixed stop and the stop on said member to vary the stroke of said member and thereby vary the action of the take-up mechanism, a swinging lever operatively connected to said stop, and a lever engageable with the first named lever whereby to hold said movable stop in either an operative or inoperative position, the lay operating mechanism including a swinging lever provided with a tappet, said first named levers being in the path of movement of said tappet and adapted to be operated thereby during the swinging of the lay to determine the position of said movable stop.

9. In a loom, the combination with the warp-beam and receiving-roll of let-off mechanism for the warp-beam, take-up mechanism for the receiving-roll, a fluid-pressure-operated member connected to operate both mechanisms simultaneously, means for varying the movement of said member to vary the operation of the take-up mechanism, and means independent of said member for varying the operation of the let-off mechanism.

10. In a loom, the combination with the heddle shaft and the warp-beam, of a tension lever having connection with said beam, means for adjusting the connection between the tension lever and the warp-beam, a compressed air cylinder for operating said means, and a valve controlling the pressure in said cylinder and operated by the movements of the heddle shaft.

11. In a loom, the combination, with the warp-beam and receiving roll, of let-off mechanism for the warp-beam and take-up mechanism for the receiving roll, a fluid-pressure-operated member connected to operate both of said mechanisms simultaneously, and separate governing means for each of said mechanisms.

12. In a loom, the combination with the warp-beam, of a tension lever, a worm wheel connected with the beam, a worm meshing with the worm wheel and operatively connected to the tension lever for turning said beam backwardly, a ratchet wheel connected to turn the worm, to "let off" a swinging pawl engaging the ratchet wheel, means for swinging the pawl, a shield for the ratchet wheel to vary the effective feed of the pawl, and a trigger operatively connected to said shield and operated by the tension lever for varying the position of said shield.

13. In a loom, the combination, with the receiving roll, of a worm wheel connected to said roll, a worm meshing with said worm wheel, a ratchet wheel connected to turn the worm, a swinging pawl to engage the ratchet wheel, a reciprocating member connected to swing the pawl, means distinct from the lay for operating said member and means for varying the stroke of said reciprocating member to produce a variable take-up.

14. In a loom, the combination with the receiving-roll, of a worm wheel connected to said roll, a worm meshing with said worm wheel, a ratchet wheel connected to turn the worm, a swinging pawl to engage the ratchet wheel, a compressed air cylinder having its piston operatively connected to the swinging pawl, means for varying the stroke of said piston, a valve for controlling the supply of compressed air to the cylinder, and means for operating the valve during each weaving operation.

15. In a loom, the combination with the heddle shaft and the receiving-roll, of a worm wheel connected to said roll, a worm meshing with said worm wheel, a ratchet wheel connected to turn the worm, a swinging pawl to engage the ratchet wheel, a compressed air cylinder having its piston connected to the swinging pawl, means for varying the stroke of said piston, and means operated by the heddle shaft during the closing of the shed to admit compressed air to said cylinder.

16. In a loom, the combination with the heddle shaft, swinging lay and receiving-roll, of a worm wheel connected to said roll, a worm meshing with said worm wheel, a ratchet wheel connected to turn the worm, a swinging pawl to engage the ratchet wheel, a compressed air cylinder having its piston connected to the swinging pawl, means controlled by the swing of the lay to vary the stroke of said piston, and means operated by the heddle shaft during the closing of the shed to admit compressed air to said cylinder.

17. In a loom, the combination with the warp-beam and the receiving-roll, of a worm wheel connected to the warp-beam, a worm meshing with said worm wheel, a ratchet wheel connected to turn the worm, a swinging pawl to engage the ratchet wheel, a worm wheel connected to said roll, a worm meshing with said last named worm wheel, a ratchet wheel connected to turn the last named worm, a swinging pawl to engage the last named ratchet wheel, a compressed air cylinder having its piston operatively connected to both of said pawls, and a valve controlling the supply of compressed air to the cylinder.

18. In a loom, the combination with the warp-beam and the receiving-roll, of a worm wheel connected to the warp-beam, a worm meshing with said worm wheel, a ratchet wheel connected to turn the worm, a swinging "let-off" pawl to engage the ratchet wheel, a worm wheel connected to said roll, a worm meshing with said last named worm wheel, a ratchet wheel connected to turn the last named worm, a swinging "take-up" pawl to engage the last named ratchet wheel, a compressed air cylinder having its piston connected to both of said pawls, a valve controlling the supply of compressed air to the cylinder, means for varying the feed of the "let-off" pawl, and means for varying the feed of the "take-up" pawl.

19. In a loom, the combination with the warp-beam, the tension lever, swinging lay and the receiving-roll, of a worm wheel connected to the warp-beam, a worm meshing with said worm wheel, a ratchet wheel connected to turn the worm, a swinging "let-off" pawl to engage the ratchet wheel, a worm wheel connected to said roll, a worm meshing with said last named worm wheel, a ratchet wheel connected to turn the last named worm, a swinging "take-up" pawl to engage the last named ratchet wheel, a compressed air cylinder having its piston connected to both of said pawls, means controlled by the movements of the tension lever to vary the feed of the "let-off" pawl, and means controlled by the swing of the lay to vary the stroke of the piston to vary the feed of the "take-up" pawl.

20. In a loom, the combination, with the receiving-roll and take-up mechanism therefor, of a compressed air cylinder, a piston in said cylinder connected to actuate said mechanism, a valve controlling the supply of air to said cylinder, and means operated during the closing of the shed to open said valve.

21. In a loom, the combination, with the receiving-roll and take-up mechanism therefor, of a compressed air cylinder, a piston in said cylinder connected to actuate said mechanism, means for varying the stroke of said piston, a valve controlling the supply of air to said cylinder, and means operated during the closing of the shed to open said valve.

22. In a loom, the combination, with the swinging lay, the receiving-roll and take-up mechanism for said roll, of a compressed air cylinder, a piston in said cylinder connected to actuate said mechanism, means controlled by the swing of the lay for varying the stroke of said piston, a valve controlling the supply of air to said cylinder, and means operated during the closing of the shed to open said valve.

23. In a loom, the combination with the receiving-roll and the lay operated mechanism, including a swinging lever, of take-up mechanism, including a reciprocating member, a stop movable into and out of the path of movement of said member to vary its stroke, a lever operatively connected to said stop and having notches at one end, a knock-off lever engageable with either of the notches in said notched lever whereby to vary the position of said stop, and a tappet on said swinging lever engageable with the notched lever on each swing of the lay and with the knock-off lever during an increased swing of the lay.

24. In a loom, the combination with the swinging lay and the receiving-roll, of take-up mechanism for said roll, a fluid pressure operated reciprocating member actuating said take-up mechanism, and means controlled by the swinging of the lay for varying the stroke of said reciprocating member to vary the action of the take-up mechanism.

25. In a loom, the combination with the warp-beam and tension lever, of let-off mechanism therefor including a pawl and ratchet, fluid pressure operated means for feeding the pawl to turn the ratchet, a shield for said ratchet determining the effective feed of the pawl, and means for controlling the position of said shield.

26. In a loom, the combination, with the warp-beam and receiving-roll, of let-off mechanism for the warp-beam and take-up mechanism for the receiving-roll, an operating member operatively connected to both of said mechanisms, an air cylinder, a piston working in said cylinder and connected to said member, and means for admitting compressed air to said cylinder during each weaving operation.

27. In a loom, the combination, with the warp-beam and receiving-roll, of let-off mechanism for the warp-beam and take-up mechanism for the receiving-roll, a reciprocating member operatively connected to both of said mechanisms, means for varying the stroke of said member to vary the operation of the take-up mechanism, and means independent of said member for varying the operation of the let-off mechanism.

28. In a loom, the combination, with the warp-beam and receiving-roll, of let-off mechanism for the warp-beam and take-up mechanism for the receiving-roll, a reciprocating member operatively connected to both of said mechanisms, means for varying the stroke of said member to vary the operation of the take-up mechanism, means independent of said member for varying the operation of the let-off mechanism, an air cylinder, a piston working in said cylinder and connected to said member, and means for admitting compressed air to said cylinder.

29. In a loom, the combination with the receiving-roll, of a ratchet wheel, a driving connection between said ratchet wheel and said roll, a swinging pawl to engage the ratchet wheel, a compressed air cylinder having its piston operatively connected to the swinging pawl, means for varying the stroke of said piston, a valve for controlling the supply of compressed air to the cylinder, and means for operating said valve.

30. In a loom, the combination with the heddle shaft and receiving-roll, of a ratchet wheel, a driving connection between said ratchet wheel and said roll, a swinging pawl to engage the ratchet wheel, a compressed air cylinder having its piston connected to the swinging pawl, means for varying the stroke of said piston, and means operated by the heddle shaft during the closing of the shed to admit compressed air to said cylinder.

31. In a loom, the combination with the heddle shaft, swinging lay and receiving-roll, of a ratchet wheel, a driving connection between said ratchet wheel and said roll, a swinging pawl to engage the ratchet wheel, a compressed air cylinder having its piston connected to the swinging pawl, means controlled by the swing of the lay to vary the stroke of said piston, and means operated by the heddle shaft during the closing of the shed to admit compressed air to said cylinder.

32. In a loom, the combination with the warp-beam and the receiving-roll, of a rachet wheel, a driving connection between said ratchet wheel and warp-beam, a swinging pawl to engage the ratchet wheel, a second ratchet wheel, a driving connection between said last named ratchet wheel and said roll, a swinging pawl to engage the last named ratchet wheel, a compressed air cylinder having its piston operatively connected to both of said pawls, and a valve controlling the supply of compressed air to the cylinder.

33. In a loom, the combination with the warp-beam and the receiving-roll, of a ratchet wheel, a driving connection between said ratchet wheel and warp-beam, a swinging "let-off" pawl to engage the ratchet wheel, a second ratchet wheel, a driving connection between said last named ratchet wheel and said roll, a swinging "take-up" pawl to engage the last named ratchet wheel, a compressed air cylinder having its piston connected to both of said pawls, a valve controlling the supply of compressed air to the cylinder, means for varying the feed of the "let-off" pawl, and means for varying the feed of the "take-up" pawl.

34. In a loom, the combination with the warp-beam, the tension lever, swinging lay and the receiving-roll, of a ratchet wheel, a driving connection between said ratchet wheel and warp-beam, a swinging "let-off" pawl to engage the ratchet wheel, a second ratchet wheel, a driving connection between said last named ratchet wheel and said roll, a swinging "take-up" pawl to engage the last named ratchet wheel, a compressed air cylinder having its piston connected to both of said pawls, means controlled by the movements of the tension lever to vary the feed of the "let-off" pawl, and means controlled by the swing of the lay to vary the stroke of the piston to vary the feed of the "take-up" pawl.

35. In a loom, the combination with the receiving-roll and the lay-operated mechanism including a swinging lever, of take-up mechanism including a fluid pressure operated reciprocating member, a stop movable into and out of the path of said member to vary its stroke, a lever operatively connected to said stop and having notches at one end, a knock-off lever engageable with either of the notches in said notched lever whereby to vary the position of said stop, and a tappet on said swinging lever engageable with the notched lever on each swing of the lay and with the knock-off lever during an increased swing of the lay.

36. In a loom, the combination with the swinging lay and the receiving-roll, of take-up mechanism for said roll, a reciprocating member actuating said mechanism and provided with a stop, a fixed stop, a stop movable into and out of position between the fixed stop and the stop on said member to vary the stroke of said member and thereby vary the action of the take-up, a lever operatively connected to said stop and having notches at one end, a knock-off lever engageable with either of the notches in said notched lever whereby to vary the position of said movable stop, and a tappet on said swinging lever engageable with the notched lever on each swing of the lay and with the knock-off lever during an increased swing of the lay.

In testimony whereof, I affix my signature.

ALBERT B. WEISSENBORN.